3,192,564
WORM PRESS FOR KNEADING AND DIS-PLACING PLASTIC MASSES

Erich Beck, Goggingen, near Augsburg, Germany, and Walter Bosch, Zurich, Switzerland, assignors to Lilon Establishment, Schaan, Liechtenstein
Filed June 19, 1963, Ser. No. 288,940
Claims priority, application Switzerland, June 20, 1962, 7,471/62
4 Claims. (Cl. 18—12)

The invention relates to a worm machine for continuously adding fluid and/or solid components to plastic masses, and/or for expelling such components therefrom, in particular, though not solely, for de-gassing or de-hydrating such plastic masses or for expelling monomers therefrom.

It is a main object of the invention to create a machine of this kind in which an increased de-gassing effect can be obtained by applying high speeds while simultaneonsly thoroughly kneading the material to be de-gassed by subjecting it to local pressure in a de-gassing zone in which a vacuum prevails.

Machines of this kind are known in which the mass, after having been plastified by means of a melting worm, is expanded in a widened zone immediately after having been plastified, so that the gases can be extracted through an opening provided there, without risk that the plastified mass will escape through this opening. This is achieved by a widened portion of the worm groove, this groove being filled only partially in the widened portion.

Other machines of the said kind are known in which the plastic mass, after having been melted in one worm, is fed into another worm which is arranged in alignment with the melting worm or transversely to it, the gases being removed under vacuum at the point where the plastic mass enters the second worm.

Further, it is usual in double-worm machines to provide the de-gassing zones over a certain length. The molten material enters the de-gassing chamber and is advanced therein by two worm shafts arranged either side by side or above each other, and maintained in perpetual motion to accelerate the expulsion of the gases.

It is an object of the present invention to provide even a single-worm machine with a de-gassing chamber extending lengthwise of the worm for a substantial distance, into which the molten material is fed and carried along at a high peripheral speed between the rotating single worm and the wall of the de-gassing chamber.

The essential feature of the invention consists in that the material which has been melted up at high speed in a very short worm and which is not as yet thermally homogeneous, enters the de-gassing zone and continues to be kneaded, whereby an increased homogenization is achieved. This is obtained by rotating within the evacuated de-gassing chamber a worm shaft having a so-called squeezing profile and which on a portion of the periphery is spaced 0.004 to 0.008 inch from the wall of the worm housing, whereby it temporarily subjects the material to high pressure for a short time and then immediately releases it again, due to the forwardly tapering profile of the worm threads. The angle through which the worm housing extends around the worm can be modified by arranging in the de-gassing chamber a plunger the inner face of which, which continues the wall of the worm housing, extends through a larger or smaller part of the said angle. The inner face of this plunger may have various profiles.

Due to the thorough kneading effect, to the squeezing of thin layers of the material in the squeezing profile of the worm thread, and to the quick change of surface of the portion of the material which circulates at high speed, a particularly high de-gassing effect is obtained simultaneously with the kneading effect.

In the drawing, an embodiment of the invention is represented by way of example only.

Figure 1:
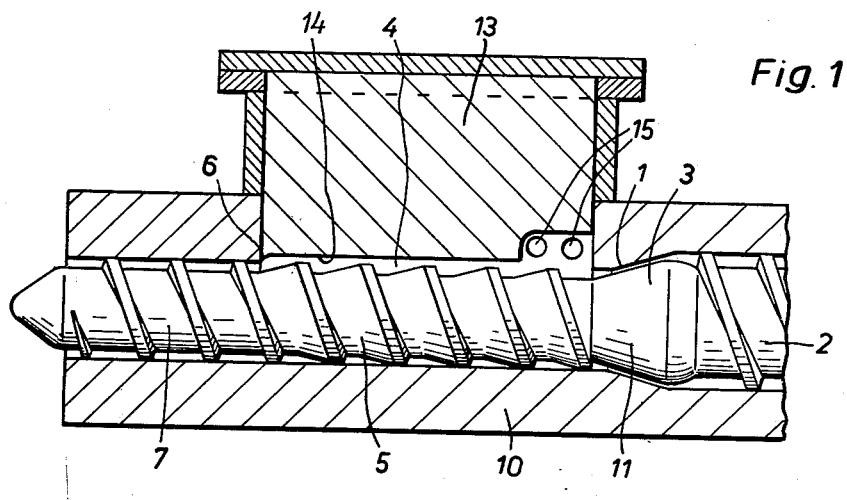
FIGURE 1 is a longitudinal section through a de-gassing apparatus constructed in accordance with the invention.

The apparatus shown in FIGURE 1 comprises a housing 10 having an axial bore the diameter of which tapers down at 1. In this bore, a worm member 11 is rotatably supported. It comprises a plastifying portion 2 where its thread is of conventional trapezoidal cross-section. This portion 2 is followed by a conical portion 3 which leaves a narrow annular gap within the tapering-down zone 1 of the housing bore. The width of this gap is adjustable by axial displacement of the worm member, in order to permit adjustment of the kneading action, and the gap also serves as a sealing means between the inlet (not shown) of the worm groove and the de-gassing chamber 4.

Figure 2:
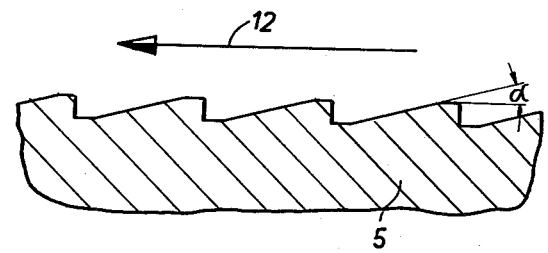
FIGURE 2 is an axial section through a portion of the worm member.

The portion 5 of the worm situated within that chamber has a longitudinal profile as shown in FIGURE 2, in which the flank of the screw thread facing downwards in the direction of advancement of the material (indicated by the arrow 12 in FIGURE 2) forms a comparatively small angle $\alpha$ with the axis of the worm member. The opposite flank of the screw thread, which is at right angles to the said axis, faces rearwards, in contradistinction to the conventional feeding worms where such a steep flank faces forwards for advancing the material. Accordingly, with the present arrangement, some of the advancing material is always squeezed back past the screw thread in a thin layer, whereupon it joins the material in the groove at the rear of that thread and proceeds again forwards with that material.

Figure 3:
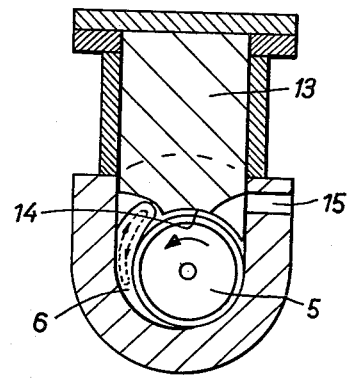
FIGURE 3 is a cross-section through the de-gassing chamber of the apparatus shown in FIGURE 1.

Adjacent the portion 5 of the worm, the de-gassing chamber 4 forms a pocket 6 (see FIGURE 3) in which a wedge-shaped portion of the material circulates as indicated by the arrow while simultaneously advancing lengthwise through that pocket.

In the de-gassing chamber 4, there may be a plunger 13 interchangeably mounted in the housing 10 and having an inner face 14 configurated for cooperation with the portion 5 of the worm. This plunger is replaceable by another one, the inner face 14 of which would be configurated otherwise than that shown in order to cooperate differently with the portion 5 of the worm, so as to modify its effect on the material under treatment; in particular, that inner face 14 may continue the wall of the worm housing through a larger or smaller angle along the worm.

The wall of the housing 10 which bounds the de-gassing chamber 4 may contain ports 15 communicating with that chamber for feeding fluid or solid substances thereinto; of course, conventional means (not shown) must be provided for insuring maintenance of the vacuum in the de-gassing chamber while the said substances are fed thereinto.

On leaving the de-gassing chamber, the material enters the final pressure feeding portion 7 of the worm member and leaves the latter through a conventional extruder head.

Preferably, the worm member is rotated at a circumferential speed of between 2 ft. 8 in. and 23 ft. per second. Tests have shown that with a circumferential speed of about 12 ft. per second, a squeezing profile as shown in FIGURE 2, with a pitch of 2 inches and a thread depth of 0.12 in. is able to treat 330 lbs. of polyamide per hour.

We claim:

1. A worm apparatus for plastifying and de-gassing plastic masses comprising a housing defining an axial passage comprising a substantially cylindrical inlet portion, a transversely widened de-gassing chamber and a substantially cylindrical delivery portion, a worm member rotatably supported in said axial passage and having a screw-threaded plastifying portion within said inlet portion, a screw-threaded squeezing portion within said de-gassing chamber, and a screw-threaded delivery portion within said delivery portion of the said axial passage in said housing, the screw-threads of said worm member in said squeezing portion having a forward flank forming a smaller angle with the axis of the worm member than the rear flank and the outer diameter of the said screw threads within said de-gassing chamber forming a narrow gap with the wall of said de-gassing chamber over a substantial portion of its periphery whereby on each revolution of the worm member part of the material in its groove is forced back through said gap in a thin layer from a zone of local high pressure to a zone in which de-gassing vacuum is effective for removing gases present in said thin layer.

2. Apparatus as claimed in claim 1 and further comprising a plunger interchangeably mounted in said housing and configured for cooperation with said squeezing portion of said worm member, said plunger being replaceable by another one configured for cooperating differently with said squeezing portion of the worm to modify its effect on the material under treatment.

3. Apparatus as claimed in claim 1 in which said axial passage in the housing comprises a sealing zone adjacent said de-gassing chamber, said worm member having a tapering portion leaving within said sealing zone of the housing passage a narrow gap adapted to be sealed by the plastified material under high pressure.

4. Apparatus as claimed in claim 1 in which said housing contains ports communicating with said de-gassing chamber for feeding fluid or solid substances thereinto.

References Cited by the Examiner
UNITED STATES PATENTS

| | | | |
|---|---|---|---|
| 2,615,199 | 10/52 | Fuller | 18—12 |
| 2,736,058 | 2/56 | Dellheim | 18—12 |
| 3,008,184 | 11/61 | Fritsch | 18—12 |
| 3,082,816 | 3/63 | Skidmore | 18—12 |

WILLIAM J. STEPHENSON, *Primary Examiner.*
MICHAEL V. BRINDISI, *Examiner.*